US009854518B2

(12) United States Patent
Verger et al.

(10) Patent No.: US 9,854,518 B2
(45) Date of Patent: Dec. 26, 2017

(54) SYSTEM AND METHOD FOR AUDIO FRAME GENERATION ALIGNMENT WITH LTE TRANSMISSION OPPORTUNITIES

(71) Applicant: APPLE INC., Cupertino, CA (US)

(72) Inventors: Luciano Verger, Santa Clara, CA (US); Lalin Theverapperuma, Cupertino, CA (US); Muhammad Alam, San Jose, CA (US); Giri Deivasigamani, San Jose, CA (US); Samy Khay-Ibbat, San Francisco, CA (US); Srinivasan Vasudevan, Sunnyvale, CA (US); Thanigaivelu Elangovan, Santa Clara, CA (US); Madhusudan Chaudhary, Sunnyvale, CA (US); Navid Damji, Cupertino, CA (US); Johnson Sebeni, Fremont, CA (US); Jianxiong Shi, Dublin, CA (US); Shivesh Makharia, Santa Clara, CA (US); Sree Kodali, Sunnyvale, CA (US); Onur Tackin, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 131 days.

(21) Appl. No.: 14/498,457

(22) Filed: Sep. 26, 2014

(65) Prior Publication Data
US 2015/0092644 A1 Apr. 2, 2015

Related U.S. Application Data

(60) Provisional application No. 61/883,872, filed on Sep. 27, 2013.

(51) Int. Cl.
*H04W 52/02* (2009.01)
*H04W 72/04* (2009.01)
(Continued)

(52) U.S. Cl.
CPC ....... *H04W 52/0216* (2013.01); *H04L 65/602* (2013.01); *H04W 72/0413* (2013.01);
(Continued)

(58) Field of Classification Search
None
See application file for complete search history.

(56) References Cited

U.S. PATENT DOCUMENTS

| 8,199,725 B2 | 6/2012 | Yu et al. | |
| 2005/0073997 A1* | 4/2005 | Riley | H04L 29/06027 370/352 |

(Continued)

FOREIGN PATENT DOCUMENTS

WO 2009/026291 2/2009

*Primary Examiner* — Ayaz Sheikh
*Assistant Examiner* — Mariela Vidal Carpio
(74) *Attorney, Agent, or Firm* — Fay Kaplun & Marcin, LLP

(57) ABSTRACT

A station that generates data packets to be transmitted by the station such that the data packets spend a minimum amount of time in a buffer prior to transmission. The method includes receiving a specification for a connected discontinuous reception (C-DRX) cycle, the specification indicating when a plurality of onDurations of the C-DRX cycle occurs, the onDurations having a predetermined interval therebetween, receiving data at a known time relative to the C-DRX cycle, determining a modification to a conversion process that converts the data to data packets such that the data packets are stored in a buffer at a subframe immediately preceding one of the onDurations subsequent to the known time, performing the conversion process based upon the modification and storing the data packets at the subframe immediately preceding the one of the onDurations. In one embodiment, the data is raw audio data and the data packets are audio packets.

18 Claims, 4 Drawing Sheets

(51) Int. Cl.
*H04W 76/04* (2009.01)
*H04L 29/06* (2006.01)
*G10L 19/00* (2013.01)
*H04W 72/12* (2009.01)

(52) U.S. Cl.
CPC ........... *H04W 76/048* (2013.01); *G10L 19/00* (2013.01); *H04W 72/1284* (2013.01); *Y02B 60/50* (2013.01)

(56) References Cited

U.S. PATENT DOCUMENTS

| | | | |
|---|---|---|---|
| 2010/0150091 A1 | 6/2010 | Yu et al. | |
| 2011/0292854 A1 | 12/2011 | Terry et al. | |
| 2012/0092991 A1* | 4/2012 | Jeong | H04L 47/25 370/235 |
| 2012/0140650 A1 | 6/2012 | Bruhn | |
| 2012/0207069 A1* | 8/2012 | Xu | H04W 52/0222 370/311 |
| 2013/0194991 A1* | 8/2013 | Vannithamby | H04W 72/0493 370/311 |
| 2013/0201890 A1* | 8/2013 | Swaminathan | H04W 88/06 370/311 |
| 2013/0252674 A1* | 9/2013 | Hsieh | H04W 52/0251 455/566 |
| 2014/0036880 A1* | 2/2014 | Dalsgaard | H04W 52/0216 370/336 |
| 2014/0064160 A1* | 3/2014 | Verger | H04W 72/14 370/311 |
| 2014/0064165 A1* | 3/2014 | Chung | H04W 52/02 370/311 |
| 2014/0071868 A1* | 3/2014 | Bergquist | H04L 1/1864 370/311 |
| 2014/0092733 A1* | 4/2014 | Johansson | H04W 52/0216 370/230 |
| 2014/0208071 A1* | 7/2014 | Jeong | G06F 15/7807 712/31 |
| 2014/0274038 A1* | 9/2014 | Singhal | H04W 52/0209 455/434 |
| 2015/0049678 A1* | 2/2015 | Speight | H04W 72/042 370/329 |
| 2015/0050935 A1* | 2/2015 | Maniatis | H04W 76/068 455/437 |
| 2015/0092643 A1* | 4/2015 | Khay-Ibbat | H04W 52/0203 370/311 |
| 2015/0092647 A1* | 4/2015 | Tabet | H04W 28/0221 370/311 |
| 2015/0208462 A1* | 7/2015 | Lee | H04W 52/0212 370/311 |
| 2015/0215825 A1* | 7/2015 | Kim | H04W 36/0088 370/331 |
| 2015/0293574 A1* | 10/2015 | Ehsan | G06F 1/3206 713/322 |
| 2016/0057804 A1* | 2/2016 | Karlsen | H04W 52/0216 455/422.1 |
| 2016/0094605 A1* | 3/2016 | Dortmund | H04W 56/00 370/329 |

* cited by examiner

SYSTEM AND METHOD FOR AUDIO FRAME GENERATION ALIGNMENT WITH LTE TRANSMISSION OPPORTUNITIES

PRIORITY CLAIM/INCORPORATION BY REFERENCE

This application claims priority to U.S. Provisional Application 61/883,872 entitled "System and Method for Audio Frame Generation Alignment with LTE Transmission Opportunities," filed on Sep. 27, 2013, the entirety of which is incorporated herein by reference.

BACKGROUND INFORMATION

A station may establish a wireless connection to a wireless communications network using a variety of different hardware and software. During the connection with the network, the station may be configured with a specification or schedule in which information may be received to determine wireless properties such as channel estimation, time tracking loop, frequency tracking loop, etc. The information may further indicate grants in which data packets may be uplinked or downlinked. Also while connected to the network, the station may execute an application in which data is transmitted. Specifically, the data may be converted into data packets for the transmission. However, the transmission of the data packets must be configured according to the specification and the received information.

SUMMARY

In one exemplary embodiment, a method is performed by a station. The method includes receiving a specification for a connected discontinuous reception (C-DRX) cycle, the specification indicating when a plurality of onDurations of the C-DRX cycle occurs, the onDurations having a predetermined interval therebetween, receiving data at a known time relative to the C-DRX cycle, determining a modification to a conversion process that converts the data to data packets such that the data packets are stored in a buffer at a subframe immediately preceding one of the onDurations subsequent to the known time, performing the conversion process based upon the modification and storing the data packets at the subframe immediately preceding the one of the onDurations.

In a further exemplary embodiment, a system includes a transceiver and a processor. The transceiver is configured to establish a connection to a network. The processor is coupled to a memory, wherein the processor is programmed to align a generation of data packets with a connected discontinuous reception (C-DRX) cycle by being programmed to receive a specification from the network for the C-DRX cycle, the specification indicating when a plurality of onDurations of the C-DRX cycle occurs, the onDurations having a predetermined interval therebetween, receive data at a known time relative to the C-DRX cycle, determine a modification to a conversion process that converts the data to data packets such that the data packets are stored in a buffer at a subframe immediately preceding one of the onDurations subsequent to the known time, perform the conversion process based upon the modification and store the data packets at the subframe immediately preceding the one of the onDurations.

In another exemplary embodiment, a non-transitory computer readable storage medium includes a set of instructions executable by a processor. The executing of the instructions causes the processor to receive a specification for the C-DRX cycle, the specification indicating when a plurality of onDurations of the C-DRX cycle occurs, the onDurations having a predetermined interval therebetween, receive raw audio data at a known time relative to the C-DRX cycle, determine a modification to a conversion process that converts the raw audio data to audio packets such that the audio packets are stored in a buffer at a subframe immediately preceding one of the onDurations subsequent to the known time, perform the conversion process based upon the modification and store the audio packets at the subframe immediately preceding the one of the onDurations.

DETAILED DESCRIPTION

Figure 1:
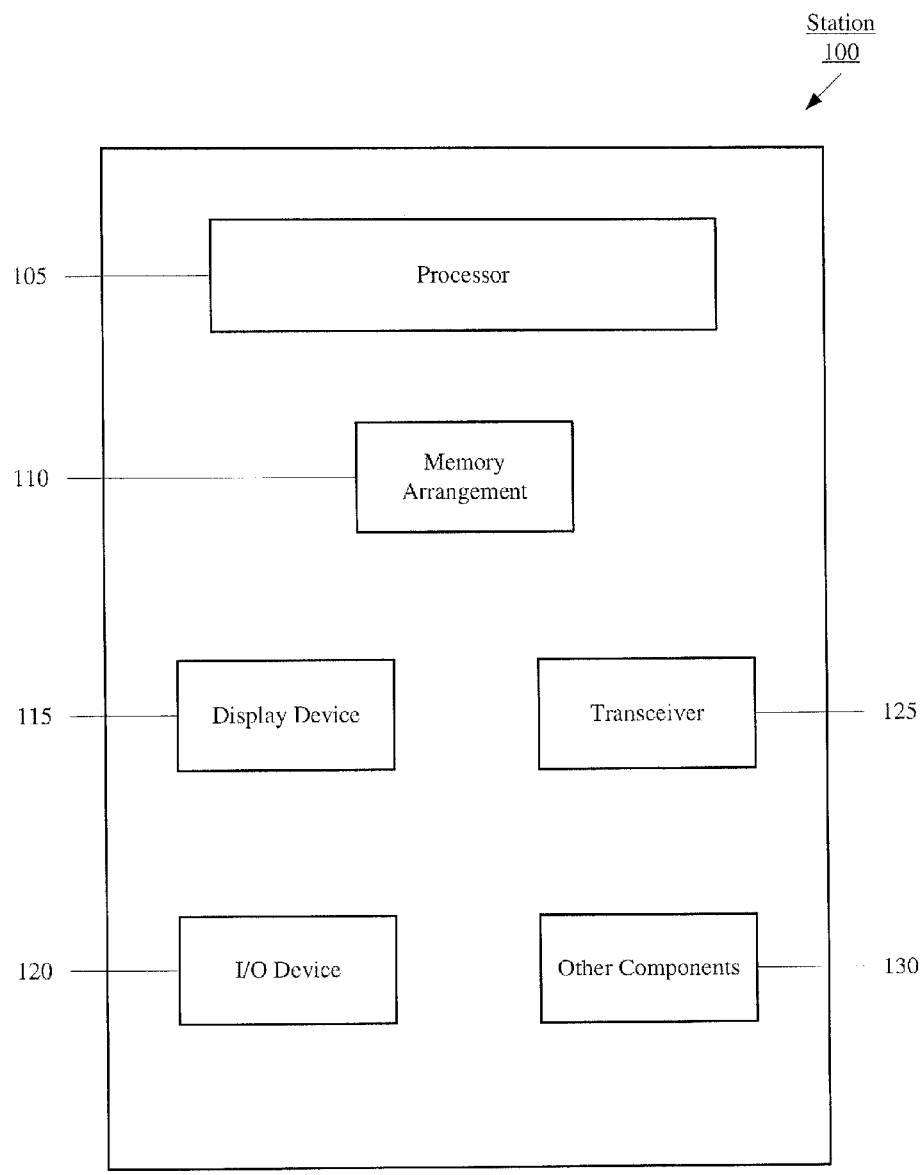
FIG. 1 shows an exemplary station aligning an audio frame generation with LTE transmission opportunities.

The exemplary embodiments may be further understood with reference to the following description and the related appended drawings, wherein like elements are provided with the same reference numerals. The exemplary embodiments are related to a system and method for aligning an audio frame generation with a transmission opportunity. Specifically, in a Long Term Evolution (LTE) network, a station connected to the LTE Network may utilize a connected discontinuous reception (C-DRX) to conserve power by using an active mode of processing only during an onDuration of the C-DRX. That is, control channel information may be received and processed during this active mode while a resting mode may be used at all other times. The control channel information may include a physical downlink control channel (PDCCH) information that may indicate when a grant (e.g., uplink or downlink) is allocated to the station. An application such as a Voice over LTE (VoLTE) may be executed with its functionalities being performed independently of the C-DRX cycle. However, when a transmission of data packets for the VoLTE is required, the transmission depends upon the C-DRX cycle. By aligning the generation of the audio frame and the LTE transmission opportunities as indicated by the C-DRX, adverse effects otherwise experienced from storing the VoLTE data packets in a buffer for a relatively extended period of time may be decreased or eliminated. The audio frame generation for VoLTE, the LTE transmission opportunity, the LTE network, the C-DRX, and a related method will be described in further detail below.

Throughout this description, the exemplary embodiments will be described with reference to an LTE communication network. However, it will be understood by those skilled in the art that the exemplary embodiments may be applicable to other types of wireless communications networks in accordance with the principles described herein. The exemplary embodiments may be applied to any wireless communication network that includes a discontinuous reception cycle for a station connected to the network.

A station may establish a connection to a wireless communications network via a base station (e.g., an eNodeB (hereinafter "eNB") in LTE networks). To properly be prepared for demodulating transmitted signals (i.e., received signals), the station must be configured with proper settings. Specifically, properties related to the physical layer of the transceiver used to connect to the network must be known. For example, the channel (e.g., band of frequencies) must be known for the incoming signal in order for it to be properly received. In another example, the wireless properties including timing parameters must be known for data packets to be properly transmitted. Therefore, control channel information such as physical downlink control channel (PDCCH) information including grant information, reference symbols, etc. may be received in a background operation during connection with the LTE network.

A station connected to the LTE network may utilize a predetermined manner of receiving the control channel information. That is, the C-DRX cycle may be used. For example, in a LTE Internet protocol (IP) Multimedia Subsystem (IMS) enabled network, the station is expected to have specified uplink transmission opportunities based upon the control channel information that is received in the known schedule. The C-DRX relates to utilizing the active mode of processing and the resting mode of processing in order to conserve power. The C-DRX may include a specification or schedule in which the control channel information is received. Therefore, only when the control channel information is to be received, the active mode of processing is used. The time at which the control channel information is received may be described as the onDuration for the C-DRX cycle. The onDuration relates to a number of frames over which the station reads downlink control channel information every C-DRX cycle before entering the sleep mode or using the resting mode. Thus, at all other times during the C-DRX cycle, the station may utilize the resting mode. The C-DRX cycle may have a predetermined duration such as 40 milliseconds (ms), 20 ms, etc. For example, at a time 0, there may be an onDuration for the control channel information to be received in which the active mode is used; subsequently, upon the onDuration lapsing, the resting mode is used; then at time 40 ms, there may be another onDuration; subsequently, the resting mode is again used until time 80 ms; etc.

The station connected to the LTE network may also execute applications in which a data transmission is required to be scheduled prior to actually transmitting it. Accordingly, the station may transmit a scheduling request (SR) to the eNB. The SR relates to a request for the data transmission to be transmitted or uplinked from the station. Upon receiving the SR, the eNB may generate the control channel information to be transmitted to the station. This control channel information may include an indication of whether the data transmission is allocated an uplink grant.

The application executing on the station that requires a data transmission may be used in an independent manner. Specifically, the preparation of the data packets in the uplink data transmission may be performed without consideration of the C-DRX cycle. For example, on IMS enabled wireless devices (e.g., cellular phone), the audio frames related to a VoLTE application may be generated using a predetermined pulse code modulation (PCM) sampling independently of the uplink transmission opportunities under C-DRX. Accordingly, the audio frames are codified and encapsulated into real time transport protocol (RTP)/IP data packets stored in an uplink transmission buffer until an uplink grant is allocated.

The impact of using the C-DRX cycle and the independent generation of uplink data packets stored in a buffer until the opportunity is granted may lead to adverse effects for the executed application (e.g., VoLTE). Specifically, a longer duration that the uplink data packets (e.g., voice packets) are stored in the buffer may lead to excessive delays on the receiver side. The exemplary systems and methods provide a manner of decreasing the time that the voice packets spend in the buffer such that the talk spurt may be heard without the above described adverse effects.

FIG. 1 shows an exemplary station aligning an audio frame generation with LTE transmission opportunities. Specifically, the station 100 may exchange data with a base station (e.g., the eNB) of a wireless network, receive control channel information therefrom, and generate uplink data packets aligned with an uplink grant included in the control channel information. The station 100 may represent any electronic device that is configured to perform wireless functionalities. For example, the station 100 may be a portable device such as a phone, a smartphone, a tablet, a phablet, a laptop, etc. In another example, the station 100 may be a stationary device such as a desktop terminal. The station 100 may include a processor 105, a memory arrangement 110, a display device 115, an input/output (I/O) device 120, a transceiver 125, and other components 130. In particular, when the station 100 is configured to perform the VoLTE application, the other components 130 may include an audio input device and an audio output device. The other components may further include, for example, a battery, a data acquisition device, ports to electrically connect the station 100 to other electronic devices, etc.

The processor 105 may be configured to execute a plurality of applications of the station 100. For example, the applications may include a web browser when connected to a communication network via the transceiver 125. In another example, the applications may include a VoLTE application such that a talk spurt from a user of the station 100 is converted into voice packets for an uplink transmission. The voice packets may require the SR transmission to be uplinked prior to an actual transmission of the voice packets. The processor 105 may also execute a conversion application that receives raw audio from the user and converts this into the voice packets. The processor 105 may further execute a scheduling application that is used for the C-DRX cycles. Specifically, the scheduling application determines the onDurations of the C-DRX cycle as well as SR transmission opportunities. The conversion application and the scheduling application may be executed in a background relative to the user and may also be automatically executed. That is, upon a connection with the network, the scheduling application may be executed whereas, upon the VoLTE application being executed, the conversion application may be executed. The memory arrangement 110 may be a hardware component configured to store data related to operations performed by the station 100. Specifically, the memory arrangement 110 may store the control channel information and the specification for the C-DRX and the SR opportunities. The memory arrangement 110 may further include the buffer that stores the data packets to be included in the uplink transmission (e.g., voice packets of the VoLTE application). The display device 115 may be a hardware component configured to show data to a user while the I/O device 120 may be a hardware component that enables the user to enter inputs. It should be noted that the display device 115 and the I/O device 120 may be separate components or integrated together such as a touchscreen.

It should be noted that the exemplary applications do not need to be executed by the processor 105. For example, the functionality described herein for one or more of the applications may be performed by a separate integrated circuit with or without firmware.

The conversion application executed by the processor 105 may receive the raw audio from the user. The raw audio may be a talk spurt during execution of the VoLTE application. The conversion application may perform a plurality of functionalities to generate the voice (or audio) packets to be included in an uplink transmission. For example, the raw audio may be received in an analog format. The analog format may initially be converted into a digital format. The conversion application may use an encoder to generate an encoded digital format, which is used for a packetization process. The packetization process may relate to a user datagram protocol (UDP)/RTP/IP process. Therefore, the conversion application may receive the raw audio and generate the corresponding audio packets. It should be noted that the conversion application may also utilize a robust header compression (RoHC) process to generate the audio packets. As described above, the audio packets may be stored in the buffer of the memory arrangement 110.

This conversion process has a known overall time duration of execution since the sound sampling for the analog to digital conversion is known and the encoding time, the packetization time, and the RoHC time each have a known time duration. In a specific example, in a 20 ms audio sample (raw audio), there may be 320 samples of audio in which there are 33 bytes by frame and 93 bytes by IPv6 packet. Using the known sound sampling rate, the raw audio may be converted to the audio packets in a known time duration from a calculation performed by the conversion application. Therefore, as will be described in further detail below, the conversion application may utilize an audio sampling rate (e.g., pulse code modulation) that minimizes a time that the audio packets are stored in the buffer.

The transceiver 125 may be a hardware component configured to transmit and/or receive data. That is, the transceiver 125 may enable communication with other electronic devices directly or indirectly through a network based upon an operating frequency of the network. The transceiver 125 may operate on a variety of different frequencies or channels (e.g., set of consecutive frequencies). Thus, an antenna (not shown) coupled with the transceiver 125 may enable the transceiver 125 to operate on the various frequencies. The transceiver 125 may be used for transmissions that are received from the eNB and sent to the station. In a first example, the control channel information may be received from the eNB via the transceiver 125 during the onDuration as indicated by the C-DRX cycle. In a second example, the SR may be transmitted to the eNB via the transceiver 125 at a determined SR opportunity as determined by the scheduling application. In a third example, the audio packets may be transmitted to a server of the LTE network at the allocated time indicated by an uplink grant included in the control channel information.

It should be noted that the conversion application may indicate when a talk spurt is beginning to the scheduling application. In this manner, the scheduling application may generate an uplink SR for the audio packets that will be generated for this talk spurt. Since the SR is transmitted to the eNB prior to an onDuration of the C-DRX cycle, the scheduling application may receive the control channel information during this onDuration to receive the uplink grant that is included therein.

Figure 2:
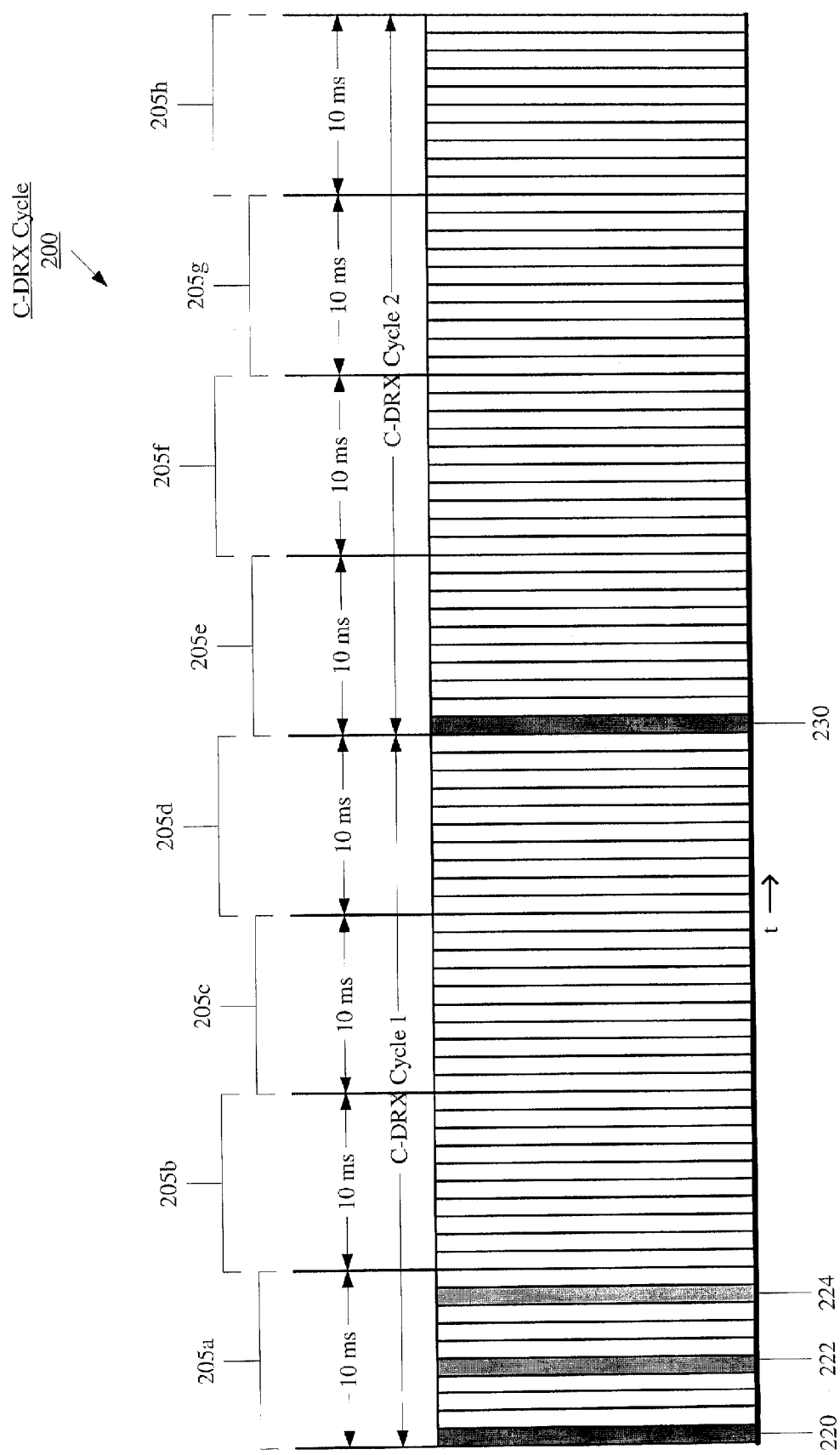
FIG. 2 shows an exemplary C-DRX cycle used by the exemplary station of FIG. 1.

FIG. 2 shows an exemplary C-DRX cycle 200 used by the exemplary station 100 of FIG. 1. As described above, the C-DRX cycle 200 may be based upon a known specification or schedule. Therefore, the scheduling application may utilize this C-DRX cycle 200. The C-DRX cycle 200 may include a plurality of frames 205*a-g*. Each frame 205*a-g* may have a duration of 10 ms. Each frame 205*a-g* may also include a plurality of equal duration subframes having a duration of 1 ms. During these subframes, the control channel information may be received as indicated by the C-DRX cycle 200. For example, as shown in FIG. 2, a first subframe 220 of the frame 205*a* (dark gray shading) may be a time when the control channel information is received. A first subframe 230 of the frame 205*e* (dark gray shading) may be another time when the control channel information is received. These subframes 220 and 230 may be defined as the OnDuration of the C-DRX cycle. In this example, two C-DRX cycles are shown. Each C-DRX cycle is 40 ms (e.g., 4 frames of 10 ms each or 40 subframes of 1 ms each). Thus, there is 40 ms between each OnDuration subframe, (e.g., there is 40 ms between subframe 220 and subframe 230)

The control channel information received in the first subframe 220 of the frame 205*a* may include PDCCH information that indicates when an uplink transmission in a physical uplink shared channel (PUSCH) may be performed. As shown in FIG. 2, the fifth subframe 222 of the frame 205*a* (medium gray shading) may be when the uplink PUSCH is performed. Subsequently, an acknowledgement (ACK)/negative acknowledgement (NACK) may be received/transmitted in the ninth subframe 224 of the frame 205*a* (light gray shading). It may be assumed that the SR was transmitted prior to the frame 205*a*. Accordingly, the control channel information received in the frame 205*a* may include the uplink grant. However, as shown in FIG. 2, the control channel information may also include a zero grant for uplink and/or downlink. For example, a SR may not have been transmitted between the frame 205*a* and 205*e*. Therefore, no uplink or downlink may be performed from frame 205*e*.

Figure 3:
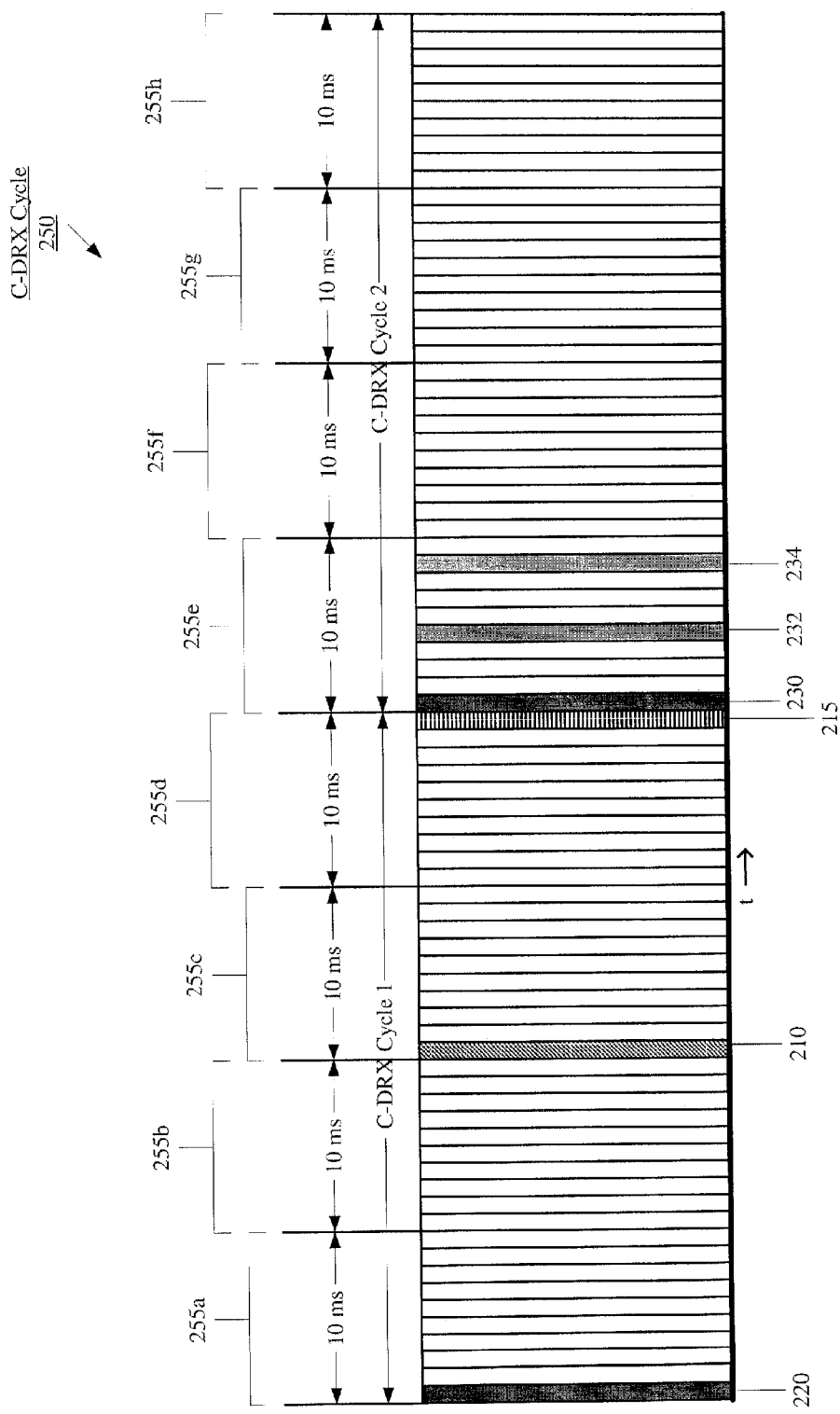
FIG. 3 shows an exemplary aligning of the audio frame generation with the onDuration of a C-DRX cycle.

FIG. 3 shows an exemplary aligning of the audio frame generation with the onDuration of a C-DRX cycle 250. FIG. 3 shows the C-DRX cycle 200 described above with regard to FIG. 2. However, in FIG. 3, there may be no grants included in the first subframe 220 of the frame 255*a*. FIG. 3 further illustrates that during a subframe 210 of the frame 255*c*, a talk spurt may begin. As described above, the scheduling application may receive an indication from the conversion application that the talk spurt has begun and transmit the SR on an immediately following available SR transmission opportunity.

When the audio packet generation is performed independently of the C-DRX cycle, the conversion application may begin the conversion process using a predetermined audio sampling rate. Therefore, the overall time for conversion (analog to digital time [based upon the audio sampling rate], encoder time, packetization time, and RoHC time) may result in the audio packets being stored in the buffer for two or more subframes prior to a subsequent onDuration. As shown, the following onDuration after the subframe 210 may be the first subframe 230 of the frame 255*e*.

According to the exemplary aligning of the audio packet generation, the audio sampling rate may be dynamically selected such that the audio packets are stored in the buffer for a minimal amount of time. Specifically, as shown in FIG. 3, the subframe 215 of the frame 255*d* (the final subframe of the frame 255*d*) may be a time when the audio packets are stored in the buffer. That is, the audio packets are stored in the buffer in the subframe immediately preceding the onDuration (e.g., subframe 230) in which the control channel information including the uplink grant for the talk spurt corresponding to these audio packets is received (first subframe 230 of the frame 255*e*). Therefore, the storage time in the buffer is minimized.

Since the scheduling application is aware of when the onDurations are to occur for the C-DRX cycle, the conversion application may also be aware of this information. The conversion application may also have known times for the encoder time, the packetization time, and the RoHC time. Therefore, the talk spurt that is received in the subframe 210 may be modified using a dynamic audio sampling rate that is determined by the conversion application for the audio to digital conversion. Specifically the audio sampling rate may be determined based upon the following full onDuration in which the relevant control channel information is received for this talk spurt. Therefore, using the known time until the next onDuration (first subframe 230 of frame 255*e*) relative to the beginning of the talk spurt (subframe 210), the conversion application may calculate the audio sampling rate that must be used for the audio packets to be stored in the buffer at the subframe 215.

It should be noted that the conversion application may have restrictions with regard to a selection of the audio sampling rate. For example, selection of the audio sampling rate may have an upper extreme limit. In another example, the selection of the audio sampling rate may have a lower extreme limit. The upper and lower extreme limits may be based upon predetermined acceptance values for the analog to digital conversion that does not result in different forms of adverse effects.

Once the audio packets are stored in the buffer at the subframe 215, the following subframe (first subframe 230 of frame 255*e*) may be the onDuration when the control channel information is received. This control channel information may include the uplink grant for the audio packets stored in the buffer at subframe 215. As illustrated in FIG. 3, the uplink transmission for the audio packets may be at the fifth subframe 232 of the frame 255*e* in which the ACK/NACK may be received/transmitted in the ninth subframe 234 of the frame 255*e*.

Figure 4:
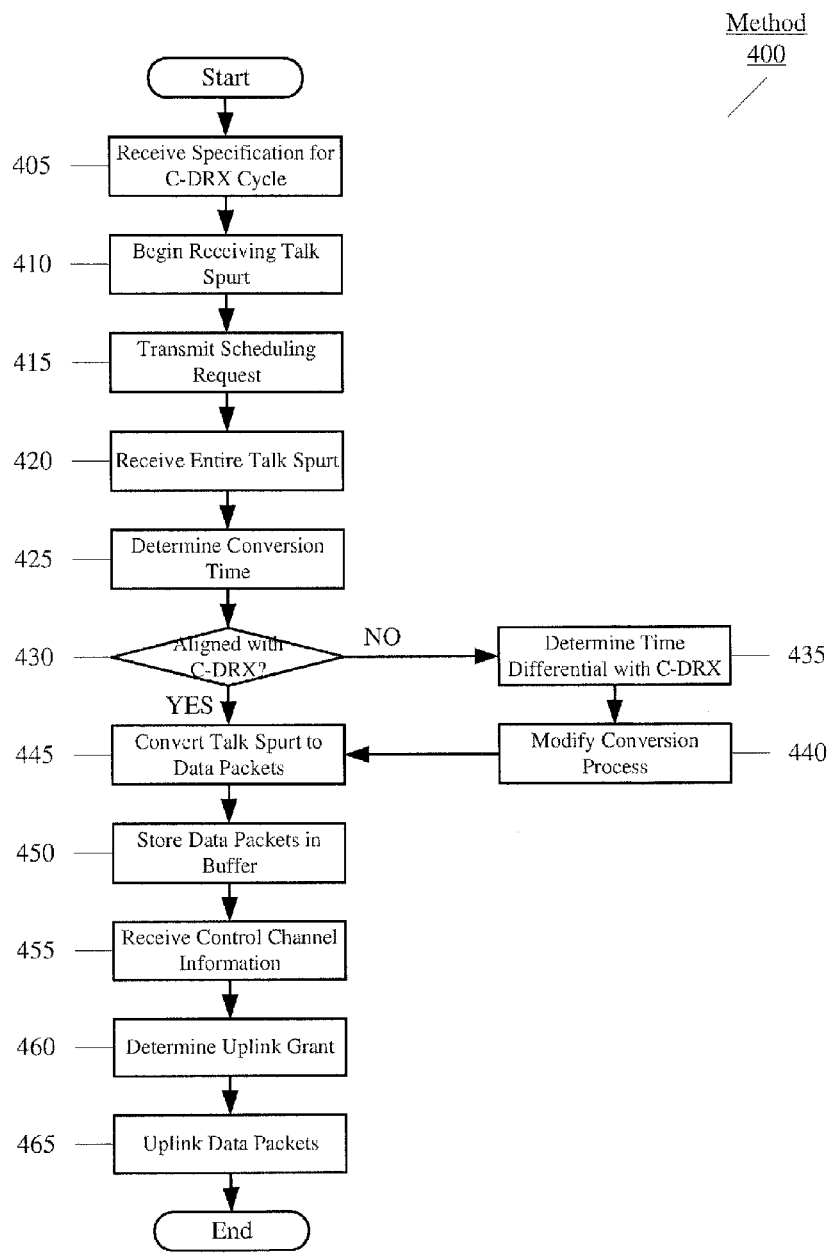
FIG. 4 shows an exemplary method for aligning the audio frame generation with the LTE transmission opportunities.

FIG. 4 shows an exemplary method 400 for aligning the audio frame generation with the LTE transmission opportunities. The method 400 relates to the conversion application performing the converting of raw audio of a talk spurt into audio packets as well as the scheduling application having a known C-DRX cycle to determine when an uplink grant opportunity may be used. The method 400 will be described with regard to the station 100 of FIG. 1 and the C-DRX cycle 250 of FIG. 3.

In step 405, the scheduling application receives the specification for the C-DRX cycle. For example, upon connection to the eNB of the LTE network, the station 100 may receive the C-DRX cycle that is to be used. Therefore, the C-DRX cycle 250 may be determined by the scheduling application.

In step 410, the talk spurt may begin to be received by the conversion application. For example, the subframe 210 may be when the talk spurt begins. In step 415, the scheduling application transmits the SR on a following SR transmission opportunity for the talk spurt. In step 420, the talk spurt is received for the conversion to be performed.

In step 425, the conversion application may determine the conversion time to generate the audio packets using a predetermined audio sampling rate. This predetermined audio sampling rate may be a standard or customary rate that is used conventionally. In step 430, the conversion application may determine whether the conversion time for the talk spurt is aligned with the C-DRX cycle 250. Specifically, the conversion application determines whether the conversion time results in the audio packets to be stored in the buffer in an immediately preceding subframe of an onDuration in which the control channel information including the uplink grant for the talk spurt is received.

If the conversion application determines that the conversion time is not aligned with the C-DRX cycle 250, the method 400 continues to step 435. In step 435, the conversion application determines the time differential with the C-DRX cycle 250. Specifically, the conversion application determines whether the conversion time results in the audio packets to be stored in the buffer prior to the preceding subframe of the onDuration (subframe 215) or subsequent thereto. In step 440, the conversion application modifies the conversion process. Specifically, the audio to digital conversion is modified in which the audio sampling rate is selected such that the preceding subframe of the onDuration is when the audio packets are stored in the buffer. For example, if the conversion time is determined to result in the audio packets to be stored in the buffer prior to the preceding subframe 215, the audio sampling rate may be decreased to substantially delay the audio packets from being generated and stored in the buffer. In another example, if the conversion time is determined to result in the audio packets to be stored in the buffer subsequent to the preceding subframe 215, the audio sampling rate may be increased to substantially hasten the audio packets from being generated and stored in the buffer.

In step 445, the conversion application converts the talk spurt from raw audio into the audio packets using the selected audio sampling rate, the known encoder time, the known packetization time, and the known RoHC time. In step 450, the audio packets are stored in the buffer. Specifically, the audio packets are stored in the buffer at the subframe 215. In step 455, the active power mode is used for the onDuration in frame 255*e* to receive the control channel information. In step 460, the control channel information (e.g., the PDCCH information) is decoded to determine the uplink grant for the audio packets stored in the buffer (based upon the SR that was transmitted in step 415). In step 465, the audio packets in the buffer may be included in the uplink transmission at a subframe as indicated by the control channel information.

It should also be noted that the above description relating primarily to voice data in VoLTE is only exemplary. Those skilled in the art will understand that the selective prevention of SR transmission may also be applied to non-voice data traffic when a time sensitive characteristic allows for a buffering until the determined onDuration of the C-DRX cycle. This may be achieved, for example, by having an additional primitive between the radio link control (RLC) and media access control (MAC) indicating to the MAC whether it should prevent the SR from being sent until the next onDuration of the C-DRX cycle or not for the data.

The exemplary embodiments provide a system and method of adjusting a manner of converting raw audio into audio packets to be stored in a buffer for a minimal amount of time. The raw audio may be received and a SR may be transmitted at a start thereof. The raw audio may be converted using a selected audio sampling rate to ensure that the audio packets corresponding to the raw audio is stored in the buffer at a subframe immediately preceding a subframe in which an onDuration is scheduled for a C-DRX cycle. During this onDuration, control channel information may be received that indicates when an uplink transmission is to be performed for the audio packets that are stored in the buffer.

It should be noted that the exemplary system and method being utilized with the C-DRX is only exemplary. The exemplary system and method may further be utilized in systems in which C-DRX is not enabled. For example, the exemplary system and method may also be used in semi-persistent scheduling or with dynamic scheduling. Although respective modifications may be used for semi-persistent scheduling and dynamic scheduling, the concept of adjusting the audio sampling rate may result in a minimal amount of time that generated audio packets spend stored in a buffer. For example, the conversion application may be configured to calculate a grant periodicity that indicates a cycle in which uplink transmissions are allocated for the audio packets. The grant periodicity may be used in a substantially similar manner as the C-DRX cycle.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform, MAC OS, iOS, Android OS, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
   at a station:
   receiving a specification, from a base station, for a connected discontinuous reception (C-DRX) cycle, the specification indicating when a plurality of onDurations of the C-DRX cycle occurs, the onDurations having a predetermined interval therebetween;
   receiving, by an input audio device, input audio data at a known time relative to the C-DRX cycle;
   determining a duration of a conversion process that converts the input audio data to data packets;
   determining a modification to the conversion process that alters the duration of the conversion process wherein the modified conversion process aligns the conversion of the data packets with a subframe immediately preceding one of the onDurations subsequent to the known time and includes a change to an audio sampling rate for the input audio data;
   performing the conversion process based upon the modification; and
   storing the data packets at the subframe immediately preceding the one of the onDurations.

2. The method of claim 1, further comprising:
   transmitting a scheduling request after receiving the input audio data and before storing the data packets;
   receiving control channel information at the one of the onDurations, the control channel information indicating when the data packets are allocated an uplink transmission grant.

3. The method of claim 1, wherein the input audio data is raw audio data and the data packets are audio packets.

4. The method of claim 3, wherein the determining the modification includes:
   calculating a time to convert the raw audio data to audio packets based on a predetermined audio sampling rate.

5. The method of claim 4, wherein the calculating the time to convert the raw audio data to audio packets includes:
   determining one of an encoding time, a packetization time, or a robust header compression time.

6. The method of claim 1, wherein the change to the audio sampling rate is one of an increase to the audio sampling rate and a decrease of the audio sampling rate.

7. A station, comprising:
   a transceiver configured to establish a connection to a network;
   an input audio device configured to receive input audio data; and
   a processor coupled to a memory, wherein the processor is programmed to align a generation of data packets with a connected discontinuous reception (C-DRX) cycle, the processor being programmed to:
   receive a specification, from a base station connected to the network, for the C-DRX cycle, the specification indicating when a plurality of onDurations of the C-DRX cycle occurs, the onDurations having a predetermined interval therebetween;
   receive the input audio data at a known time relative to the C-DRX cycle;
   determining a duration of a conversion process that converts the input audio data to data packets;
   determine a modification to the conversion process that alters the duration of the conversion process wherein the modified conversion process aligns the conversion of the data packets with a subframe immediately preceding one of the onDurations subsequent to the known time and includes a change to an audio sampling rate for the input audio data;
   perform the conversion process based upon the modification; and
   store the data packets at the subframe immediately preceding the one of the onDurations.

8. The station of claim 7, wherein the processor is further programmed to:
   transmit a scheduling request after receiving the input audio data and before storing the data packets;
   receive control channel information at the one of the onDurations, the control channel information indicating when the data packets are allocated an uplink transmission grant.

9. The station of claim 8, wherein a first set of programmed actions includes the receiving a specification, the receiving data, the determining a modification, the performing a conversion and the storing data packets and wherein the first set of programmed actions are included in programming instructions of a first application program and a second set of programmed actions includes the transmitting a scheduling request and the receiving control channel information and wherein the second set of programmed actions are included in programming instructions of a second program.

10. The station of claim 9, wherein the first application program is a Voice over LTE (VoLTE) application.

11. The station of claim 7, further comprising:
   wherein the input audio data is raw audio data and the data packets are audio packets.

12. The station of claim 11, wherein the processor is programmed to determine the modification by:
   calculating a time to convert the raw audio data to audio packets based on a predetermined audio sampling rate.

13. The station of claim 12, wherein the processor is programmed to calculate the time to convert the raw audio data to audio packets by:

determining one of an encoding time, a packetization time, or a robust header compression time.

14. The station of claim 7, wherein the change to the audio sampling rate is one of an increase to the audio sampling rate and a decrease of the audio sampling rate.

15. A non-transitory computer readable storage medium including a set of instructions executable by a processor, wherein executing the instructions causes the processor to:
  receive a specification, from a base station, for the C-DRX cycle, the specification indicating when a plurality of onDurations of the C-DRX cycle occurs, the onDurations having a predetermined interval therebetween;
  receive from an input audio device input audio data at a known time relative to the C-DRX cycle;
  determining a duration of a conversion process that converts the input audio data to audio packets;
  determine a modification to the conversion process that alters the duration of the conversion process wherein the modified conversion process aligns the conversion of the audio packets with a subframe immediately preceding one of the onDurations subsequent to the known time and includes a change to an audio sampling rate for the input audio data;
  perform the conversion process based upon the modification; and
  store the audio packets at the subframe immediately preceding the one of the onDurations.

16. The non-transitory computer readable storage medium of claim 15, wherein the instructions further cause the processor to:
  transmit a scheduling request after receiving the input audio data and before storing the audio packets;
  receive control channel information at the one of the onDurations, the control channel information indicating when the audio packets are allocated an uplink transmission grant.

17. The non-transitory computer readable storage medium of claim 15, wherein the change to the audio sampling rate is one of an increase to the audio sampling rate and a decrease of the audio sampling rate.

18. The non-transitory computer readable storage medium of claim 15, wherein the instructions further cause the processor to:
  calculate a time to convert the input audio data to audio packets based on a predetermined audio sampling rate; and
  determine one of an encoding time, a packetization time, or a robust header compression time.

* * * * *